Figure 1:
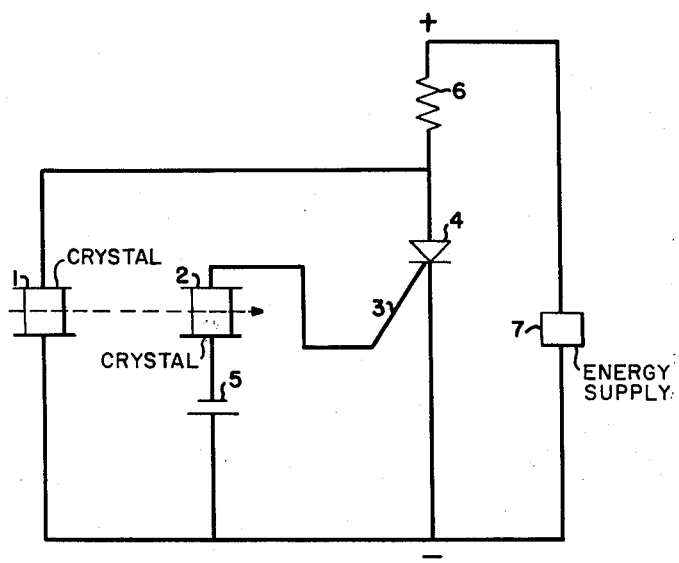
Figure 2:
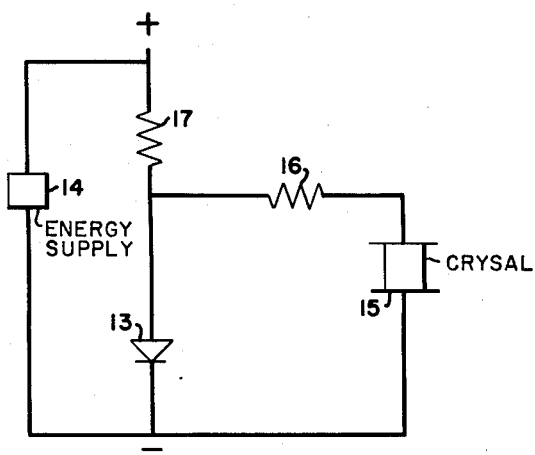

Gerald Moss
Peter Oliver Rogers    Inventors

By Small, Thomas, Dunham & Marx
    W. O. Heilman    Patent Attorney

March 17, 1964 G. MOSS ETAL 3,125,295
ULTRASONIC ATOMIZER
Filed Dec. 22, 1961 2 Sheets-Sheet 2

GERALD MOSS
PETER OLIVER ROGERS   Inventors

SMALL, THOMAS, DUNHAM & MARX

By W. O. Heilman
Patent Attorney

329;125,295
Patented Mar. 17, 1964

3,125,295
ULTRASONIC ATOMIZER
Gerald Moss, North Oxford, and Peter Oliver Rogers, Chievely, near Newbury, Berkshire, England, assignors to Esso Research and Engineering Company, a corporation of Delaware
Filed Dec. 22, 1961, Ser. No. 161,710
Claims priority, application Great Britain Dec. 30, 1960
5 Claims. (Cl. 239—102)

This invention relates to the activation of piezo-electric or magneto-strictive transducer devices. The invention, although not limited thereto, is particularly applicable to the activation of piezo-electric devices intended to effect the atomization of liquids.

It is known that liquids may be atomized by the employment of sonic energy devices and a description of such an application of sonic energy devices is to be found in a paper by J. N. Antonovich, entitled "Ultrasonic Atomization of Liquids" which appeared in "Transactions of Ultrasonics" (February 1959, pages 6–15) a journal published by the United States Institute of Radio Engineers.

When an alternating voltage is applied to a piezo-electric crystal, the piezo-electric crystal will be cyclically thickened and thinned and will develop compression and rarefraction waves of sonic, or ultrasonic energy which may be utilized by suitable means to atomize liquids. The amount of energy which is available for this purpose approaches a maximum when the frequency of excitation approaches a resonant frequency of the crystal.

It will be obvious that some means to vibrate the piezo-electric crystal or magnetic-strictive transducer at its resonance frequency must be provided. It has been proposed to vibrate a piezo-electric crystal by means of a valve oscillator or, alternatively, by a rotary generator or alternator. Such means are expensive, require constant maintenance, and are not robust.

In the present invention means for vibrating a piezo-electric crystal or magneto-strictive transducer are provided that are simple and comparatively inexpensive, and that require less maintenance than the valve oscillator, or rotary generator means previously proposed. According to the present invention there is provided, in circuit with the piezo-electric crystal or magneto-strictive transducer, a silicon p.n. p.n. diode and a resistance in series with the silicon p.n. p.n. diode, the diode being connected in parallel with the piezo-electric crystal or magneto-strictive transducer and means, for example a storage battery or mains supply, to supply a voltage to the circuit. The circuit is so arranged that a varying voltage appears across the silicon p.n. p.n. diode in order to provide an intermittent surge to the piezo-electric crystal or magneto-strictive transducer whereby the piezo-electric crystal or magneto-strictive transducer is caused to vibrate at its resonance frequency or at a harmonic of its resonance frequency. In the invention alternating or direct current may be employed as a source of power.

The silicon p.n. p.n. diode has the characteristic that a large current is passed when either a voltage in excess of a certain value is passed across the diode in the forward conducting direction or when a third electrode in the diode passes a current in excess of a certain value. Once the diode is conducting it will remain in a conducting state as long as the current that is passing exceeds a minimum value. If the current falls below this minimum value the diode effectively ceases to conduct electric current and returns to its initial quiescent condition. The order of voltage or current required to cause the diode to be conducting will be known from the published characteristics of silicon p.n. p.n. diodes.

As previously mentioned, the vibration of the piezo-electric crystal may be employed for the atomization of liquids and the invention finds particular advantage in the atomization of fuels, for example the atomization of liquid fuels in domestic burners. However, other uses for the invention will be apparent, for example in the preparation of emulsions.

Any piezo-electric crystal may suitably be used in the practice of the invention although a crystal, such as one of lead zirconate titanate, which is comparatively inexpensive and can be used at fairly high temperatures, is preferred. The crystal may also be employed in a wide range of shapes and sizes. Where the piezo-electric crystal is employed as an atomizer for liquids it will be suitably formed for the purpose of its intended use. For example, if the invention is to employ the crystal for atomizing a heating oil in a burner, the crystal may be formed with a channel so arranged that fuel oil may be drawn from a reservoir through the channel to the tip of the crystal and atomized at the crystal tip by the vibration of the crystal.

Figure 3:
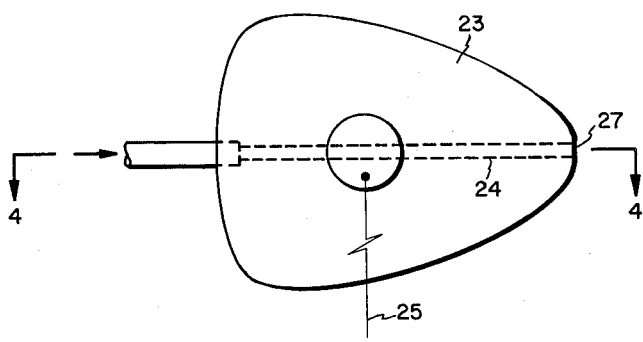
Figure 4:
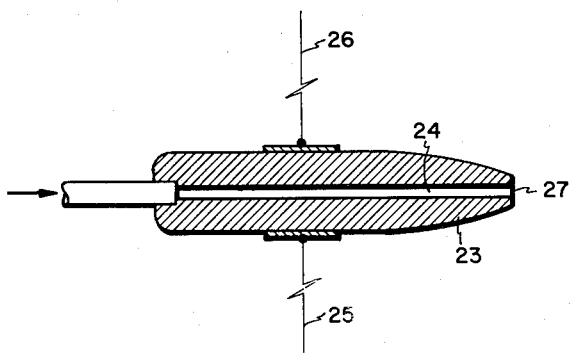

The invention is further illustrated by reference to the accompanying drawings wherein FIGURES I and II depict example forms of alternative circuits that may be employed in the invention. FIGURE 3 represents a side view of a piezo-electric crystal adapted with a fuel channel. FIGURE 4 depicts a horizontal cross section of the same crystal taken along line 4—4.

In the circuit shown in FIGURE I, a piezo-electric crystal 1 is physically linked, as for example by adhesion or by clamping, to a second piezo-electric crystal 2 so that the vibrations of one of the crystals are transmitted to the other crystal which is caused to resonate at a similar frequency or at a harmonic of that frequency. 4 is a p.n. p.n. silicon diode and 3 a trigger electrode. 6 is a resistance in series with the diode 4. 5 is a source of bias voltage which may, or may not, be required according to the characteristics of the diode used. 7 is a source of electrical energy, e.g. a storage battery or mains supply.

At the commencement of an operation the diode 4 will be nonconducting and the piezo-electric crystals, 1 and 2, at rest. Sufficient voltage is applied to the trigger electrode 3 to cause the diode to conduct a large current which is drawn through the resistance 6. The starting trigger voltage may be applied by a battery 5 or by random noise voltages in the circuit. The value of the resistance 6 is such that, when the diode is fully conducting, the voltage drop across the resistance 6 produces a current through the diode less than its sustaining current and the diode ceases to conduct. During this cycle the crystal 1, which acts effectively as a condenser in the circuit, is discharged through the diode and recharged through the resistance 6. The time for these events depends upon the size of the crystal and the value of the resistance 6. The variation of voltage across the crystal 1 causes it to vibrate and these vibrations are transmitted by it to crystal 2 which produces voltages on its surface. One of these voltages, in a suitable phase, is applied to the trigger electrode 3 which triggers off the diode 4 thus recommencing the cycle of operations; in this way the crystal 1 is caused to be kept in a state of continuous vibration as long as electrical energy is being supplied to the circuit.

FIGURE II shows a circuit in which the trigger electrode is omitted and the p.n. p.n. diode is caused to conduct current in an alternative manner. In this circuit 13 is a p.n. p.n. silicon diode and 17 a resistance in series therewith. In parallel with the diode 13 is a single piezo-electric crystal 15 and a resistance 16. 14 is a source of electrical energy. In this case a sufficient voltage is applied across the resistance 17 and diode 13 to make the diode heavily conducting. The charge then existing on the crystal 15 is discharged through the resistance 16 and the diode 13. The purpose of the resistance 16 is to limit the value of the initial discharge current in order to protect the diode 13 from overloading and possible damage. When the crystal 15 has been completely discharged the current passing through resistance 17 is too small to maintain the diode in its conducting state; the diode then becomes non-conducting and the crystal 15 becomes charged at a rate governed by its effective capacity and the resistances 16 and 17. The varying voltage applied to the crystal 15 by the foregoing events causes it to vibrate and to be kept in a state of vibration as long as electrical energy continues to be supplied from the primary source 14.

FIGURE 3 depicts a piezo-electric crystal 23 in side view. Fuel oil, in this embodiment, is drawn from a resrevoir (not shown) and passed to the tip 27 of said crystal by way of channel 24 through the interior of the crystal. Oscillating current brought by conductor 25 causes the crystal to resonate resulting in atomization of the fuel oil at tip 27.

FIGURE 4 represents the above crystal 23 in a horizontal cross section view across line 4—4. The new element in this figure is conductor 26 which serves to complete the circuit across the piezo-electric crystal.

The values of operating variables, such as voltage and resistance, required for the practice of the invention, will be apparent to those skilled in the art; for example, when using a lead zirconate titanate piezo-electric crystal, and a silicon p.n. p.n. diode of the type D.S.1.G as manufactured by the Ferranti Co., with a supply voltage of 100 volts, a suitable value for the resistance 17 was found to be 10,000 ohms and, for the resistance 16, 100 ohms. The resonant frequency of the circuit depends upon the physical dimensions of the lead zirconate titanate piezo-electric crystal selected. Frequencies ranging from about 30 kc. or less to 1 mc. or more are obtainable. Generally this frequency will be an inverse function of the crystal thickness.

As previously mentioned the supply for the circuit may be alternating current or direct current. When alternating current is supplied the circuit operates, as described herein, on positive half cycles but it has also been found, unexpectedly, to operate in a similar manner on negative half cycles in that the diode becomes conductive when the voltage exceeds the reverse value of its breakdown voltage and the piezo-electric crystal commences to vibrate. Thus, for each complete A.C. cycle two surges of vibration are obtained from the crystal instead of only one.

What is claimed is:

1. Means to apply an intermittent electrical surge effect to a piezo-electric crystal to cause it to vibrate at its resonance frequency or at a harmonic of its resonance frequency, said means comprising an electrical circuit having a resistance in series with a voltage source and with a silicon p.n. p.n. diode, said diode arranged in parallel with at least one piezo-electric crystal.

2. Means according to claim 1 having a further resistance interposed in the circuit between the said silicon p.n. p.n. diode and a said piezo-electric crystal.

3. Means according to claim 1 having a trigger electrode for the said silicon p.n. p.n. diode said trigger electrode being placed in parallel with a piezo-electric crystal.

4. Means according to claim 3 wherein the voltage source is an alternating electric current.

5. Means according to claim 3 wherein a said piezo-electric crystal is provided with a channel whereby fluid may be drawn to the tip of the said crystal and atomized.

References Cited in the file of this patent

UNITED STATES PATENTS 2,834,158     Petermann _____ May 13, 1958

OTHER REFERENCES

Publication I: "Controlled Rectifier Manual," General Electric Company, New York, 1960, pages 83 to 85.